United States Patent [19]
Dugan et al.

[11] 3,989,898
[45] Nov. 2, 1976

[54] REMOTE MONITOR SIGNALLING SYSTEM

[76] Inventors: Thomas J. Dugan, 2056 Meadowview, Springfield, Mo. 65804; Ross M. Spencer, Route 2, Box 18, Willard, Mo. 65781

[22] Filed: Dec. 19, 1974

[21] Appl. No.: 534,216

[52] U.S. Cl.............................. 179/2 AM; 73/317; 340/180 X
[51] Int. Cl.².......................................... H04M 11/00
[58] Field of Search .............. 179/2 R, 2 A, 2 AM; 340/180 R, 188 R, 203, 206, 357, 359, 416; 73/313, 317

[56] References Cited
UNITED STATES PATENTS

| | | | |
|---|---|---|---|
| 2,007,669 | 7/1935 | Yates | 179/2 A |
| 2,168,149 | 8/1939 | Arnold | 179/2 A |
| 2,630,715 | 3/1953 | Hall et al. | 73/317 |
| 2,726,377 | 12/1955 | Hammer | 179/2 A |
| 3,072,894 | 1/1963 | Chapin | 340/180 |
| 3,266,018 | 8/1966 | Higgins | 179/2 A |
| 3,274,584 | 9/1966 | Morgan et al. | 340/188 R |
| 3,339,519 | 9/1967 | Taylor et al. | 73/317 |
| 3,588,357 | 6/1971 | Sellari | 179/2 A |

FOREIGN PATENTS OR APPLICATIONS

| | | | |
|---|---|---|---|
| 1,117,045 | 6/1968 | United Kingdom | 179/2 A |
| 1,138,742 | 1/1969 | United Kingdom | 179/2 A |

*Primary Examiner*—Kathleen H. Claffy
*Assistant Examiner*—Randall P. Myers
*Attorney, Agent, or Firm*—Clarence A. O'Brien; Harvey B. Jacobson

[57] ABSTRACT

A remote monitoring apparatus adapted for use with a commercial or private telephone communication system for activating a condition monitoring mechanism and converting the measured output thereof into data signals. The data signals are transmitted by the apparatus to a remote receiving station from which a triggering signal is derived to initiate operation of the data signalling apparatus.

16 Claims, 7 Drawing Figures

REMOTE MONITOR SIGNALLING SYSTEM

This invention relates to the transmission of information from a monitoring station to a remote receiving station by use of coded data transmitted to a commercial or private telephone communication system.

Various materials produced in different industrial installations, are stored in containers of different types and such materials must be monitored and inventories thereof maintained by personnel. This procedure involves the counting, gauging and recording or measurements through which the quantity of stored materials is determined. The foregoing monitoring procedure when performed by personnel, unavoidably involves errors that are costly. The installation of automatic monitoring and data transmitting equipment to replace personnel, has of course been devised and proposed. The cost of such equipment has however often discouraged its adoption. It is therefore, an important object of the present invention to provide apparatus for economically and reliably converting the measurement outputs of condition sensing meters into signal data capable of being transmitted to a remote location through a commercial or private telephone system and wherein operation of such data signalling equipment is controlled from said remote receiving station in order to obtain measurement information whenever desired.

In accordance with the present invention, the drive associated with a condition sensing device, is operative to not only register the measurement on a visual indicator but also positions a contactor establishing an electrical path to a selected one of a plurality of inputs to a programming control assembly through which a code tone signal is conducted from a code tone generator or oscillator triggered into operation in response to a ringing voltage. The ringing voltage for triggering operation is derived from a remote receiving station through which the monitoring station may be dialed utilizing the commercial or private telephone communication system for this purpose. The readout position of the meter is converted into code tone pulses by the programming assembly and this code tone signal is transmitted through the telephone line to the receiving station from which the ringing voltage is derived for triggering the apparatus into operation at the monitoring station. The programming control assembly includes a plurality of control cams on which a selected number of spaced contacts are mounted for engagement with different input contact elements resepectively connected electrically to conductive segments engageable by the contactor driven by the condition sensing device.

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 1:
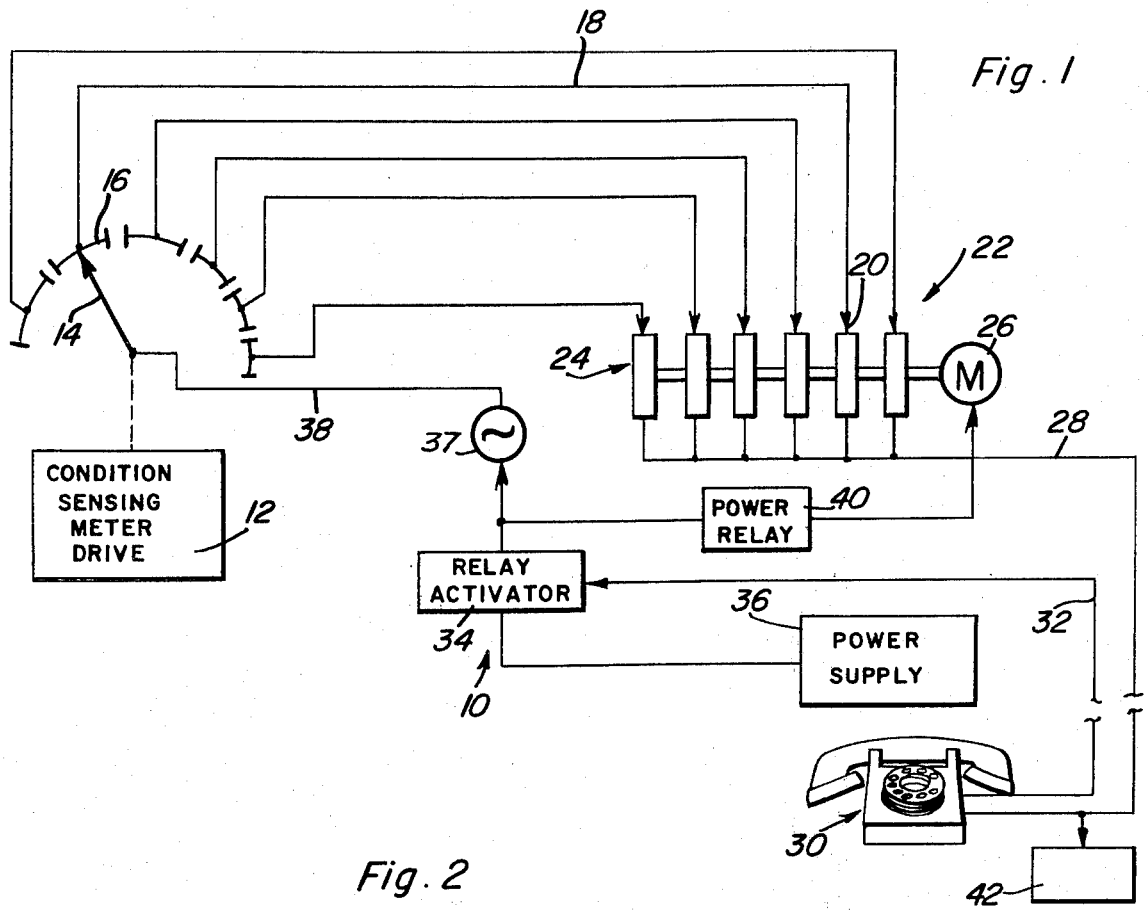
FIG. 1 is a schematic circuit diagram illustrating the system of the present invention.
Figure 5:
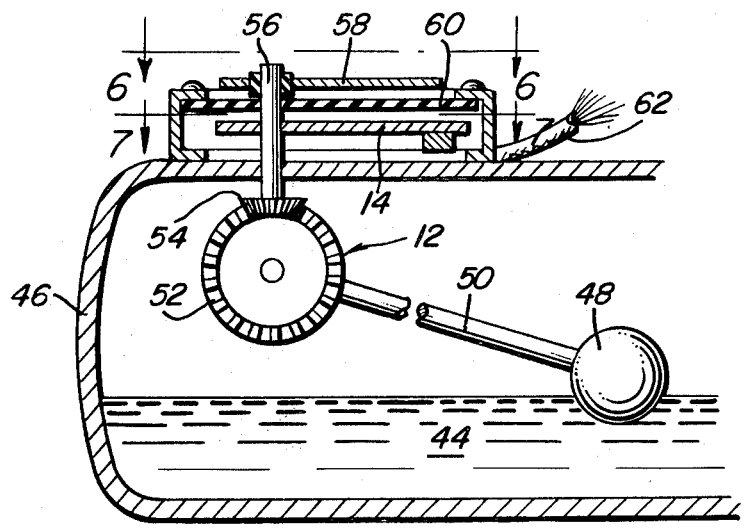
FIG. 5 is a partial side sectional view through another component associated with the system of the present invention.
Figure 6:
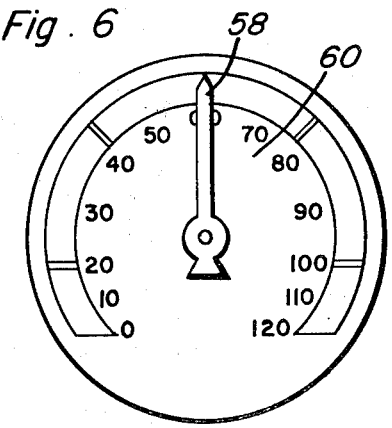
FIG. 6 is a plan view of an indicator as viewed from section line 6—6 in FIG. 5.
Figure 7:
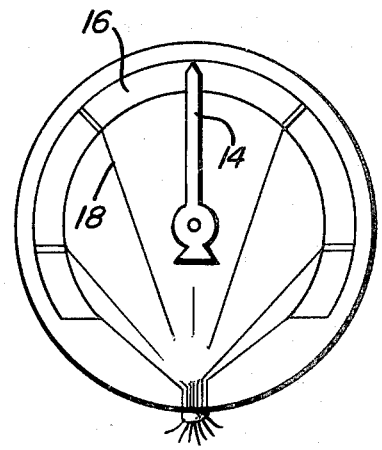
FIG. 7 is a section view taken substantially through a plane indicated by section line 7—7 in FIG. 5.

Referring now to the drawings in detail, FIG. 1 illustrates the system of the present invention generally denoted by reference numeral 10. This system is adapted to monitor some condition such as the level of liquid reflecting the quantity of fluid within a tank illustrated by way of example only in FIG. 5, the condition being monitored by a sensing device having a drive component 12 as diagrammatically illustrated in FIG. 1. It should of course be appreciated that the system may be utilized to monitor many different conditions in addition to liquid or gas quantity in storage tanks.

The drive 12 is operative to displace a code selecting switch contactor 14 that is engageable with a plurality of conductive segments 16 representing different measurement ranges of the condition being monitored. Each of the conductive segments 16 is electrically connected by one of a plurality of conductors 18 to input wiping contacts 20 associated with a programming control assembly generally referred to by reference numeral 22. The programming control assembly includes a plurality of control cams 24 respectively engageable by the wiping contacts 20 and driven in unison by a drive motor 26. Data signals are transmitted through a selected one of the control cam assemblies 24 to common output signal line 28 connected to some remotely located signal receiver such as that associated with a commercial telephone 30 adapted to be operatively coupled to the signal line 28 through a central station associated with a commercial telephone system with which the system of the present invention may be utilized.

The location at which a particular condition is being monitored, will constitute a telephone station to which a telephone dialing number may be assigned. In this fashion, by dialing the assigned number through the commercial telephone instrument 30, a ringing voltage may be delivered to the monitoring station through a ringing voltage line 32 connected to a relay activator component 34, of a type well known to those skilled in the art, which responds to the ringing voltage in order to conduct operating voltage from a power supply 37 to any suitable and conventional electronic oscillator 37 from which a predetermined signal tone output is fed by conductor 38 to the contactor 14. At the same time that the relay activator 34 sets the oscillator 37 into operation, it also feeds energizing voltage through a power relay 40 to the drive control motor 26 in order to initiate programming operation of the programming control assembly 22. The code tone output of the oscillator 37 is accordingly conducted through a selected one of the conductors 18 and control cam assemblies 24 dependent upon the position of the contactor 14 transmitting the code tone signal to the output signal line 28. This output signal will accordingly be received by the telephone instrument 30 and a suiitable indicator or recorder 42 at a location remote from the monitoring station. Recorders of this type are well known to those skilled in the art, the details of which form no part of the present invention.

Figure 2:
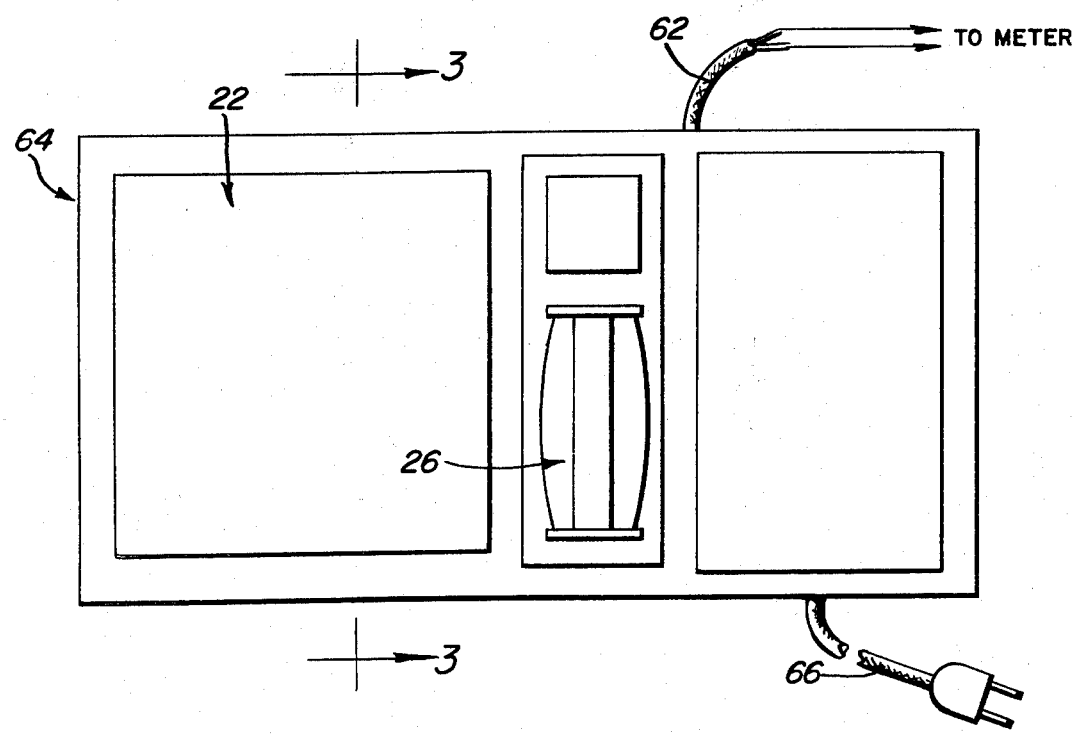
FIG. 2 is a simplified top plan view showing a component of the system depicted in FIG. 1.

Referring once again to FIG. 5, the condition being monitored by way of example is the level or quantity of a body of liquid 44 within tank 46. Thus, a float 48 is connected by means of a lever arm 50 to the meter drive 12 in the form of intermeshing bevel gears 52 and 54 respectively connected to the metering lever arm 50 and an indicator drive shaft 56. The indicator shaft 56 is connected adjacent its upper end to an indicator pointer 58 adapted to register the level of liquid on a calibrated dial card 60. Underlying the dial card 60, is the aforementioned contactor 14 engageable with the conductive segments 16 representing the different measurement ranges corresponding to those shown on the dial card 60. The conductors 18 connected to the respective segments 16 extend from the meter indicating component through cable 62 to a control box generally referred to by reference numeral 64 as shown in FIG. 2 within which the programming control assembly 22 is located as well as the drive motor 26, the oscillator 37, the relay activator 34 and power relay 40. The control box may also include the power supply 36 receiving electrical energy from the available commercial power source through the power cord 66.

Figure 3:
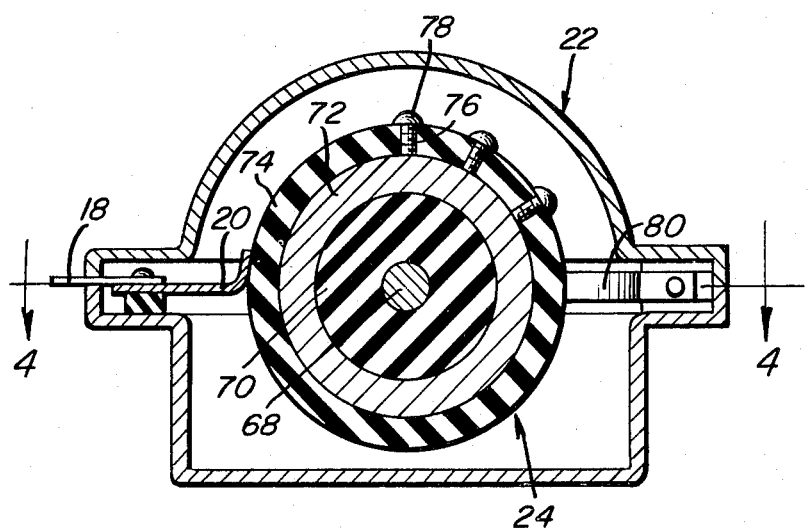
FIG. 3 is a transverse sectional view taken substantially through a plane indicated by section line 3—3 in FIG. 2.
Figure 4:
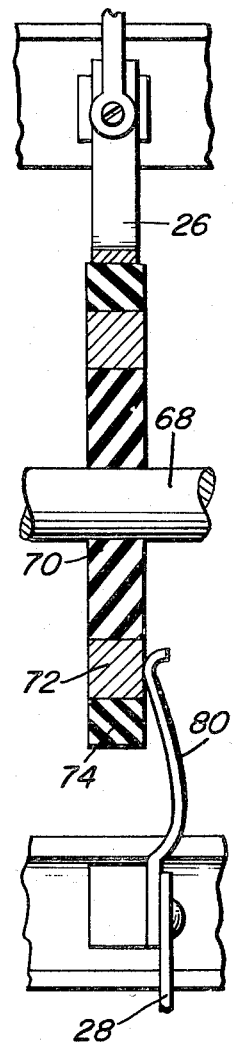
FIG. 4 is a partial sectional view taken substantially through a plane indicated by section line 4—4 in FIG. 3.

Referring now to FIGS. 3 and 4, one of the programming control cam assemblies 24 is shown mounted on the drive shaft 68 which is driven by the drive motor 26. The control cam assembly 24 includes a non-conductive core 70 fastened to the drive shaft 68 on which an annular conductive member 72 is mounted protectively enclosed within a non-conductive rim 74. The wiping contact 20 aforementioned is in engagement with the non-conductive rim 74 as shown. During each revolution of the cam assembly, momentary electrical connections are established between a contact 20 and the conductive ring 72 by means of a selected number of connectors 76 having external formations 78 engaged by the contact 20. The conductive ring 72 on the other hand, is in continuous electrical connection with the signal output line 28 through a brush element 80 in lateral wiping contact with the ring element. Thus, during each revolution of the cam assembly, a predetermined number of code tone pulses will be conducted to the remote receiving station, the number of pulses reflecting the range measurement obtained from the meter drive through the contactor 14 and conductive segments 16. Each control cam assembly 24 will accordingly have a different selected number of connectors 76 associated therewith. The information thereby transmitted will depend upon the number and spacing of the connectors 76 in accordance with any desired data code.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a telephone communication system adapted to generate a ringing voltage at a monitoring station in response to dialing thereof from a remote receiving station and a condition sensor at the monitoring station, data signalling apparatus for reporting conditions monitored by the condition sensor comprising a code generating assembly having a plurality of inputs and a common output pulse line through which the monitoring station is dialed, an oscillator generating a fixed frequency signal when energized, code selecting switch means connected to the oscillator for directly transmitting said signal to one of the inputs of the code generating assembly, drive means connecting the sensor to the switch means for selecting one of the inputs through which the signal is conducted, and relay means connected to the oscillator and the code generating assembly for simultaneously initiating operation thereof in response to said ringing voltage to transmit said signal through the common output line to the remote receiving station in the form of coded output pulses.

2. The combination of claim 1 wherein said switch means includes a rotatable contactor driven by the sensor and connected to the oscillator and a plurality of conductive segments respectively connected to the inputs of the code generating assembly and engageable by the contactor.

3. The combination of claim 2 including indicator means driven by the sensor and mounted in overlying relation to the switch means.

4. The combination of claim 1 including indicator means driven by the sensor and mounted in overlying relation to the switch means.

5. The combination of claim 1 wherein said code generating assembly further includes means for generating different coded pulse trains between each of the inputs and the common output pulse line, and motor means controlled by said relay means for rendering the generating means operative simultaneously with the oscillator.

6. In combination with a telephone communication system adapted to generate a ringing voltage at a monitoring station in response to dialing thereof from a remote receiving station and a condition sensor at the monitoring station, data signalling apparatus for reporting conditions monitored by the condition sensor comprising a code generating assembly having a plurality of inputs and a common output pulse line through which the monitoring station is dialed, an oscillator generating a fixed frequency signal when energized, code selecting switch means connected to the oscillator for directly transmitting said signal to one of the inputs of the code generating assembly, drive means connecting the sensor to the switch means for selecting one of the inputs through which the signal is conducted, and relay means connected to the oscillator and the code generating assembly for simultaneously initiating operation thereof in response to said ringing voltage to transmit said signal through the common output line to the remote receiving station in the form of coded output pulses, the programming assembly including a drive motor connected to the relay means, a plurality of control cams driven by the drive motor, each of the control cams having spaced contact elements and a continuous conductive element electrically connected thereto, a plurality of wiper contacts connected to the inputs and engageable with the spaced contact elements of corresponding control cams, and a plurality of brushes connected to the common signal output line in continuous engagement with the conductive elements of the control cams.

7. The combination of claim 6 wherein said switch means includes a rotatable contactor driven by the sensor and connected to the oscillator and a plurality of conductive segments respectively connected to the inputs of the code generating assembly and engageable by the contactor.

8. The combination of claim 7 including indicator means driven by the sensor and mounted in overlying relation to the switch means.

9. In combination with a communication system adapted to generate a trigger voltage at a monitoring station in response to an external control signal, and a condition sensor at the monitoring station, data signalling apparatus comprising a pulse code generating assembly having a plurality of inputs and a common output pulse line, an oscillator generating a continuous fixed frequency signal when energized, code selecting switch means driven by the sensor and connected to the oscillator for directly transmitting said signal to a selected one of the inputs of the code generating assembly, and relay means connected to the oscillator and the code generating assembly for simultaneously initiating operation thereof in response to said trigger voltage to transmit the signal externally of the monitoring station through said common output line in the form of code pulses.

10. The combination of claim 9 wherein said switch means includes a rotatable contactor driven by the sensor and connected to the oscillator and a plurality of conductive segments respectively connected to the inputs of the code generating assembly and engageable by the contactor.

11. The combination of claim 10 including indicator means driven by the sensor and mounted in overlying relation to the switch means.

12. The combination of claim 9 including indicator means driven by the sensor and mounted in overlying relation to the switch means.

13. The combination of claim 9 including a closed tank containing a fluid therein, said condition sensor including means for measuring the quantity of fluid in said tank and drive means connecting the measuring means to the switch means.

14. The combination of claim 9 wherein said code generating assembly further includes means for generating different pulse trains between each of the inputs and the common output pulse line, and motor means controlled by said relay means for rendering the generating means operative simultaneously with the oscillator.

15. In combination with a communication system adapted to generate a trigger voltage at a monitoring station in response to an external control signal, and a condition sensor at the monitoring station, data signalling apparatus comprising a pulse code generating assembly having a plurality of inputs and a common output pulse line, an oscillator generating a continuous fixed frequency signal when energized, code selecting switch means driven by the sensor and connected to the oscillator for directly transmitting said signal to a selected one of the inputs of the code generating assembly, and relay means connected to the oscillator and the code generating assembly for simultaneously initiating operation thereof in response to said trigger voltage to transmit the signal externally of the monitoring station through said common output line in the form of code pulses, the code generating assembly including a drive motor connected to the relay means, a plurality of control cams driven by the drive motor, each of the control cams having spaced contact elements and a continuous conductive element electrically connected thereto, a plurality of wiper contacts connected to the inputs and engageable with the spaced contact elements of corresponding control cams, and a plurality of brushes connected to the common signal output line in continuous engagement with the conductive elements of the control cams.

16. The combination of claim 15, including a closed tank containing a fluid therein, said condition sensor including means for measuring the quantity of fluid in said tank and drive means connecting the measuring means to the switch means.

* * * * *